US011638950B2

(12) United States Patent
Nunez

(10) Patent No.: US 11,638,950 B2
(45) Date of Patent: May 2, 2023

(54) ARTICLES PREPARED USING CURABLE COMPOSITIONS BASED ON POLYMERIZABLE IONIC SPECIES

(71) Applicant: Arkema France, Colombes (FR)

(72) Inventor: Sean Nunez, Exton, PA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 17/258,558

(22) PCT Filed: May 29, 2019

(86) PCT No.: PCT/EP2019/063921
§ 371 (c)(1),
(2) Date: Jan. 7, 2021

(87) PCT Pub. No.: WO2020/015905
PCT Pub. Date: Jan. 23, 2020

(65) Prior Publication Data
US 2021/0268723 A1    Sep. 2, 2021

Related U.S. Application Data

(60) Provisional application No. 62/699,938, filed on Jul. 18, 2018.

(51) Int. Cl.
| | | |
|---|---|---|
| *B29C 64/129* | (2017.01) | |
| *B22C 1/22* | (2006.01) | |
| *B33Y 10/00* | (2015.01) | |
| *B33Y 70/00* | (2020.01) | |
| *B29C 64/245* | (2017.01) | |
| *C08F 220/58* | (2006.01) | |
| *B22C 7/02* | (2006.01) | |
| *C08F 2/48* | (2006.01) | |

(52) U.S. Cl.
CPC .............. *B22C 1/2206* (2013.01); *B22C 7/02* (2013.01); *B29C 64/129* (2017.08); *B29C 64/245* (2017.08); *B33Y 10/00* (2014.12); *B33Y 70/00* (2014.12); *C08F 2/48* (2013.01); *C08F 220/585* (2020.02)

(58) Field of Classification Search
CPC ...... B22C 1/2206; C08F 220/585; C08F 2/48; B33Y 70/00; B29C 64/124; B29C 64/129; B29C 64/135; B29C 64/165
See application file for complete search history.

(56) References Cited

U.S. PATENT DOCUMENTS

| | | | |
|---|---|---|---|
| 4,959,163 | A | 9/1990 | Froehler et al. |
| 5,792,827 | A | 8/1998 | Hintze-Bruning et al. |
| 8,552,130 | B2 | 10/2013 | Lewandowski et al. |
| 8,742,047 | B2 | 6/2014 | Lewandowski et al. |
| 8,816,029 | B2 | 8/2014 | Wang et al. |
| 9,127,101 | B2 | 9/2015 | Wang et al. |
| 9,169,381 | B2 | 10/2015 | Tielemans et al. |
| 10,676,638 | B2 | 6/2020 | Chen et al. |
| 10,703,929 | B2 | 7/2020 | Berger et al. |
| 2012/0157351 | A1 | 6/2012 | Webber |
| 2012/0178845 | A1 | 7/2012 | Napadensky et al. |
| 2013/0234370 | A1 | 9/2013 | Suzuki et al. |
| 2013/0337277 | A1 | 12/2013 | Dikovsky et al. |
| 2017/0029546 | A1 | 2/2017 | Langlotz |
| 2018/0009162 | A1 | 1/2018 | Moore |

FOREIGN PATENT DOCUMENTS

| | | | |
|---|---|---|---|
| CA | 2239310 A1 | 6/1997 | |
| CA | 2239439 A1 | 6/1997 | |
| CN | 107216467 | 9/2017 | |
| CN | 107216467 A | 9/2017 | |
| CN | 108148249 A | * 6/2018 | ............. B33Y 70/00 |
| CN | 108148249 A | 6/2018 | |
| JP | 2017026680 A | 2/2017 | |
| WO | 2016121587 A1 | 8/2016 | |
| WO | 2017060638 A1 | 4/2017 | |
| WO | 2017087614 A1 | 5/2017 | |

(Continued)

OTHER PUBLICATIONS

Lui, Jianguo, et al., "High Performance Cross-Linked Poly(2-acrylamido-2-methylpropanesulfonic acid)-Based Proton Exchange Membranes for Fuel cells"., Macromolecules 2010, pp. 6398-6405, vol. 43 No. 15.

Gu, Hong, et al., "Polymerized Paired Ions as Polymeric Ionic Liquid-Proton Conductivity", Macromolecular Rapid Communications, 2016, pp. 1218-1225, vol. 37.

Magdassi, Shlomo, et al., "High-performance 3D printing of hydrogels by water-dispersible photoinitiator nanoparticles", Science Advances, 2016, 2 (4).

Wang, Qiming, et al., "Highly-stretchable 3D-architected Mechanical Metamaterials", Nature Scientific Reports, 2016, 6, 34147.

Spinks, Geoffrey, et al., "3D printing of tough hydrogel composites with spatially varying materials properties", Additive Manufacturing, 2017, pp. 24-30, vol. 14.

(Continued)

*Primary Examiner* — Joseph S Del Sole
*Assistant Examiner* — Jamel M Nelson
(74) *Attorney, Agent, or Firm* — Christopher R. Lewis

(57) ABSTRACT

Curable compositions contain at least one polymerizable ionic species and, when cured (for example, by photocuring), provide cured compositions which are thermoplastic and yet fragmentable by a protic liquid medium such as water. The polymerizable ionic species corresponds to Formula (I) A+B– wherein A+ is a cationic species having a cationic functional group and a first polymerizable, ethylenically unsaturated functional group; and B" is an anionic species having an anionic functional group and a second polymerizable, ethylenically unsaturated functional group which is the same as or different from the first polymerizable, ethylenically unsaturated functional group. The curable compositions are useful for forming sacrificial or temporary articles, for example by three-dimensional printing methods.

21 Claims, No Drawings

(56) References Cited

FOREIGN PATENT DOCUMENTS

WO 2017122211 A1 8/2017
WO 2018095823 A1 5/2018

OTHER PUBLICATIONS

Yan, Feng, et al., "Polyanionic Antimicrobial Membranes: An Experimental and Theoretical Study", Langmuir, 2017, pp. 4346-4355, vol. 33.

* cited by examiner

ARTICLES PREPARED USING CURABLE COMPOSITIONS BASED ON POLYMERIZABLE IONIC SPECIES

CROSS-REFERENCE TO RELATED APPLICATIONS

This application is a U.S. national stage application under 35 U.S.C. § 371 of international application number PCT/EP2019/063921, filed May 29, 2019, which claims priority to U.S. patent application No. 62/699,938, filed Jul. 18, 2018.

FIELD OF THE INVENTION

The present invention relates to curable compositions containing polymerizable ionic species and the production of articles, such as by three-dimensional printing methods, which utilize such curable compositions.

BACKGROUND OF THE INVENTION

One known method for manufacturing metal parts involves investment casting, wherein a pattern is used to fabricate a mold made of a refractory material. A molten metal is then cast into the mold to form a part having a desired shape. Thus, in investment casting, a disposable foundry pattern is used to produce a mold in which parts can be cast. Various ways of forming and using such a disposable foundry pattern are known in the art. For example, a disposable foundry pattern may be formed from a substance, such as a wax. The foundry pattern, which typically will have the shape or form desired in the final cast product, is thereafter invested in a refractory material. The foundry pattern is then removed from the refractory material by melting, leaving behind a mold (cavity) in the refractory material. Alternatively, it is also known to photocure (meth)acrylate monomers (i.e., monomeric compounds containing one or more acrylate and/or methacrylate functional groups per molecule) to provide disposable foundry patterns, which then (following investment in a refractory material) must be subjected to thermolysis conditions in order to create the mold. If (meth)acrylate-functionalized polyethers are instead employed, the resulting photocured disposable foundry pattern is swellable in water but is very difficult to remove from a refractory material in which it is invested using an aqueous medium without damaging the mold.

Accordingly, the development of alternative compositions from which disposable foundry patterns can be readily produced, wherein the disposable foundry pattern can be invested in a refractory material but then easily removed (without damaging the resulting mold) using an aqueous medium (in particular, using just neutral water at room temperature) would be highly desirable.

The fabrication of articles using three-dimensional printing techniques has been of great interest in recent years, wherein an article is built up layer-by-layer or continuously using a material (for example, a composition capable of being converted from a liquid to a solid by photocuring). One of the challenges in such fabrication methods is the provision of adequate support to the layers of the material as they are being built up. One approach known in the art has been to utilize a second material capable of supporting the layers of material from which the article is being constructed. However, once 3D printing of the article has been completed, the problem remains of how to separate the support material from the article, which typically is intimately associated with the support material. Separation of the support material from the article in an expeditious and thorough manner, to provide a finished article of high quality is often difficult to achieve.

SUMMARY OF THE INVENTION

Aspects of the present invention relate to a curable composition comprised of at least one polymerizable ionic species corresponding to Formula (I):

$$A^+B^- \qquad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group;
wherein (in at least certain embodiments) the curable composition does not comprise significant amounts of (meth)acrylic anhydride or water and wherein the curable composition when cured provides a cured composition which displays thermoplastic behavior in the absence of a protic liquid medium, is fragmentable in a protic liquid medium and comprises ionic crosslinks as a result of incorporation of the ionic species into a polymeric matrix.

As used herein, the term "cured" means conversion of the curable composition by at least partial reaction of the polymerizable, ethylenically unsaturated functional groups in the polymerizable ionic species to form a polymeric matrix. In accordance with various embodiments, at least 85%, at least 90%, at least 95% or at least 99% of the polymerizable, ethylenically unsaturated functional groups in the ionic species of the curable composition are reacted when the curable composition is cured. According to another aspect, the curable composition when cured is converted from a composition which is liquid at 25° C. to a composition which is solid at 25° C. In certain embodiments, a relatively hard solid is formed upon curing of the curable composition. For example, the cured composition may have a hardness greater than 20 on a Durometer 00 scale or greater than 0 on an A and D scale. The cured composition may have a glass transition temperature (Tg), as measured by dynamical mechanical analysis (DMA, 1 Hz), of at least 35° C., at least 40° C., or at least 45° C., in various exemplary embodiments of the invention. In other illustrative embodiments, the Tg of the cured composition is not greater than 150° C., not greater than 125° C., not greater than 100° C., not greater than 90° C., not greater than 80° C. or not greater than 70° C.

As used herein, the term "thermoplastic" means a substance (e.g., a polymer) that is a solid at 25° C., softens, melts or flows when exposed to heat, and re-solidifies when cooled to 25° C.

As used herein, the term "protic liquid medium" means a medium that is liquid at 25° C. and that is comprised of one or more compounds bearing one or more hydroxyl (—OH) functional groups per molecule such as water and alcohols (in particular, water-miscible alcohols) and combinations thereof as well as combinations of water and other types of water-miscible compounds such as acetic acid and/or surfactants. In particular aspects, the protic liquid medium is selected from the group consisting of water and $C_1$-$C_4$ aliphatic alcohols (e.g., methanol, ethanol, n-propyl alcohol, isopropyl alcohol, ethylene glycol, propylene glycol) and combinations thereof. According to certain aspects, the protic liquid medium is substantially neutral (pH 6-8). Water having a pH of 6 to 8 is used as the protic liquid medium in certain aspects of the invention. However, in other embodiments the protic liquid medium is acidic (pH less than 6) or basic (pH greater than 8). The pH of the protic liquid medium may be adjusted using inorganic and/or inorganic acids, bases or buffering agents. The protic liquid medium may have one or more solutes dissolved in it; for example, the protic liquid may contain one or more dissolved salts, such as sodium chloride. A cured composition prepared by curing a curable composition in accordance with the invention may be fragmented by placing the cured composition (or an article comprised of such cured composition) in contact with a liquid protic medium. Such contacting may be carried out with or without agitation or other mechanical action. For example, the protic liquid medium may be applied to the cured composition in the form of a jet. The contacting may generally be carried out at any temperature above the freezing point of the protic liquid medium. In at least certain embodiments of the invention, the cured composition is fragmentable (e.g., via progressive swelling and dissolution) by the protic liquid medium at temperatures around ambient temperature, e.g., about 15° C. to about 35° C. However, in other embodiments the protic liquid medium is at a higher temperature when contacted with the cured composition (i.e., greater than about 35° C.). The components of the curable composition, in particular the polymerizable ionic species, may be selected such that an article formed therefrom is quickly fragmented within minutes (e.g., about 5 to about 90 minutes, if the article is relatively small in size such as no more than 5 cm in its longest dimension) using only ambient temperature water. In other embodiments, an article prepared using a curable composition in accordance with the present invention is fragmented within 24 hours using ambient temperature water.

As used herein, the term "fragmentable" means a substance that is capable of being converted from a solid, dimensionally stable form to a liquefied, dispersed and/or soluble form that is not dimensionally stable (i.e., a form that is flowable). As used herein, a material is considered "dimensionally stable" if the geometry of the material does not deform under the influence of gravity at 25° C. within 1 hour. For example, an article formed using a cured composition obtained by curing the curable compositions described herein may be converted from solid, coherent form into a solution, liquid, slurry, dispersion or plurality of small solid or gel particles when contacted with a protic liquid medium such as water.

Other aspects of the present invention relate to three-dimensional printing methods employing such curable compositions, articles prepared by curing the curable compositions, and the use of such cured compositions as temporary or sacrificial materials.

DETAILED DESCRIPTION OF CERTAIN
EMBODIMENTS OF THE INVENTION

The curable compositions of the present invention comprise at least one polymerizable ionic species having certain characteristics, as will be explained in more detail subsequently. According to certain embodiments, such polymerizable ionic species may exist as liquids at, for example, room temperature (25° C.) or a temperature not greater than 100° C. In other embodiments, however, the polymerizable ionic species may be a solid at 25° C. For reactions of an acid and a base that can yield an ionic species as described herein, the simple (1:1) ion pair that can result from the use of only monovalent reactants is usually considered to be a "mixture" using EPA TSCA Inventory Representation language. In certain embodiments, the polymerizable ionic species may be considered a salt in which the cation and anion are poorly coordinated.

The polymerizable ionic species useful in the present invention have an anionic portion (derived, for example, from a BrØnsted acid) and a cationic portion (derived, for example, from a BrØnsted base) that are each organic. Moreover, both the anionic species and the cationic species of the polymerizable ionic species are each comprised of at least one polymerizable group, in particular at least one ethylenically unsaturated functional group. In preferred embodiments, both the anionic species and the cationic species each comprise a single polymerizable group, i.e., a single ethylenically unsaturated group that is polymerizable. The ethylenically unsaturated group present in the anionic species may be the same as, or different from, the ethylenically unsaturated group present in the cationic species. The curable compositions employed in the present invention may comprise one, two, three or more polymerizable ionic species.

Thus, suitable polymerizable ionic species may correspond to Formula (I):

$$A^+B^- \qquad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group. In one embodiment, the cationic species comprises a single cationic functional group. In another embodiment, the cationic species comprises a single polymerizable, ethylenically unsaturated functional group. In a further embodiment, the anionic species comprises a single anionic functional group. According to yet another embodiment, the anionic species comprises a single polymerizable, ethylenically unsaturated functional group.

As used herein, the term "polymerizable" means a substance, species, compound, moiety or functional group capable of combining by covalent bonding in an addition polymerization. According to certain embodiments, such a polymerizable substance, species, compound, moiety or functional group is capable of being polymerized by a free radical mechanism ("free-radically polymerizable"). According to other embodiments, the polymerizable substance, species, compound moiety or functional group is actinically polymerizable (i.e., capable of being polymerized by exposure to actinic radiation, such as UV or visible light).

Suitable ethylenically unsaturated functional groups include groups containing at least one carbon-carbon double bond, in particular a carbon-carbon double bond capable of participating in a reaction (e.g., a free radical reaction) wherein at least one carbon of the carbon-carbon double bond becomes covalently bonded to an atom, in particular a carbon atom, in a second molecule. Such reactions may result in a polymerization or curing whereby the species containing an ethylenically unsaturated functional group become part of a polymerized matrix or polymeric chain. The carbon-carbon double bond may, for example, be present as part of an α,β-unsaturated carbonyl moiety, e.g., an α,β-unsaturated ester moiety such as an acrylate functional group ($H_2C=CH-C(=O)O-$) or a methacrylate functional group ($H_2C=C(CH_3)-C(=O)O-$). As used herein, the term "(meth)acrylate" refers to both acrylate (—O—C(=O)CH=CH$_2$) and methacrylate (—O—C(=O)C(CH$_3$)=CH$_2$) functional groups. (Meth)acrylamide functional groups can also function as suitable ethylenically unsaturated functional groups. As used herein, the term "(meth)acrylamide" refers to both acrylamide (—NR—C(=O)CH=CH$_2$) and methacrylamide (—NR—C(=O)C(CH$_3$)=CH$_2$) functional groups, wherein R is hydrogen (H) or an organic moiety (such as an alkyl group, for example). A carbon-carbon double bond may also be present in the ethylenically unsaturated functional group in the form of a vinyl group —CH=CH$_2$ or an allyl group, —CH$_2$—CH=CH$_2$. According to certain embodiments of the invention, both the anionic species and the cationic species comprise a polymerizable functional group selected from the group consisting of a (meth)acrylamide functional group, a (meth)acrylate functional group and a vinyl functional group. According to other embodiments, both the anionic species and the cationic species comprise a (meth)acrylamide functional group. For example, the anionic species may be a (meth)acrylamide comprising an anionic functional group (e.g., a carboxylate, phosphonate, sulfinate or sulfonate functional group). The cationic species may be, for example, a protonated (meth)acrylamide (where the nitrogen atom of the (meth)acrylamide functional group may be protonated and/or where a nitrogen atom elsewhere in the (meth)acrylamide, such as a nitrogen atom which is part of an amine functional group, may be protonated).

The cationic functional group of the cationic species may be any type of functional group bearing a cationic (positive) charge. For example, the cationic functional group may be an ammonium functional group, a phosphonium functional group, or a sulfonium functional group. In particularly preferred embodiments, the cationic functional group is a protonated amino group. For example, the protonated amino group may be a protonated primary amino group —NH$_3^+$, a protonated secondary amino group —NRH$_2^+$ wherein R is an organic moiety such as an alkyl group, or a protonated tertiary amino group —NR$^1$R$^2$H$^+$ where R$^1$ and R$^2$ are the same or different and are organic moieties such as alkyl groups) or a protonated amido group —C(=O)NR$^3$R$^4$H$^+$ (where R$^3$ and R$^4$ are the same or different and are selected from the group consisting of hydrogen and organic moieties, such as alkyl).

Suitable cationic species include, for example, protonated (meth)acrylamide, protonated N,N-dimethyl(meth)acrylamide, protonated N-substituted-(N'-dialkylaminoalkyl) (meth)acrylamides, protonated aminoalkyl(meth)acrylates, protonated N,N-dialkylaminoalkyl(meth)acrylates, protonated diacetone (meth)acrylamides and protonated tert-butylaminoethyl (meth)acrylates.

The anionic functional group of the anionic species may be any type of functional group bearing an anionic (negative) charge. For example, the anionic functional group may be an carboxylate functional group [—C(=O)O$^-$], a phosphonate functional group [—P(=O)(X)O$^-$, wherein X is —OH, —O$^-$ or —OR, with R being an organic moiety such as an alkyl group], a sulfonate functional group [—S(=O)$_2$O$^-$], or a sulfinate functional group [—S(=O)O$^-$].

Suitable anionic species include, for example, 2-acrylamido-2-methylpropane sulfonate, 2-methylacrylamido-2-methylpropanesulfonate, 2-acrylamidobutanesulfonate, 2-acrylamido-2,4,4-trimethylpentanesulfonate, vinylsulfonates, allylsulfonates, acrylates, methacrylates, crotonates, itaconates, maleates, fumarates, itaconates, vinylphosphonates, allylphosphonates, N-(meth)acrylamidoalkylphosphonates, and (meth)acryloyloxyalkylphosphonates and combinations thereof.

The polymerizable ionic species described herein as being suitable for use in the curable compositions of the present invention may be readily prepared by combining appropriate precursors to the polymerizable cationic species and the polymerizable anionic species, wherein upon combining such precursors undergo interaction with each other to yield the polymerizable ionic species.

For example, the precursor to the polymerizable cationic species may be an ethylenically unsaturated nitrogen-containing compound such as (meth)acrylamide, an N,N-dimethyl(meth)acrylamide, an N-substituted-(N'-dialkylaminoalkyl) (meth)acrylamide, an aminoalkyl(meth)acrylate, an N,N-dialkylaminoalkyl(meth)acrylate, a diacetone (meth)acrylamide or a tert-butylaminoethyl (meth)acrylate or a combination of two or more of such compounds.

The precursor to the polymerizable anionic species may be, for example, an ethylenically unsaturated acid functional monomer such as an ethylenically unsaturated carboxylic acid, an ethylenically unsaturated sulfonic acid, an ethylenically unsaturated sulfinic acid and/or an ethylenically unsaturated phosphonic acid including, for example, 2-acrylamido-2-methylpropane sulfonic acid, 2-methylacrylamido-2-methylpropanesulfonic acid, 2-acrylamidobutanesulfonic acid, 2-acrylamido-2,4,4-trimethylpentanesulfonic acid, vinylsulfonic acids, allylsulfonic acids, acrylic acid, methacrylic acid, crotonic acid, itaconic acid, maleic acid, fumaric acid, itaconic acid, vinylphosphonic acid, allylphosphonic acid, N-(meth)acrylamidoalkylphosphonic acid, and (meth)acryloyloxyalkylphosphonic acid. Salts of such acids, such as alkali metal or ammonium salts, could also be used.

According to certain embodiments, the precursor to the polymerizable cationic species may have a pKa of 3 to 16. In accordance with other embodiments, the precursor to the polymerizable anionic species may have a pKa of −10 to 10.

According to certain embodiments, curable compositions in accordance with the present invention may be predominantly comprised of one or more polymerizable ionic species corresponding to Formula (I). For example, the curable composition may be comprised of at least 10, at least 20, at least 30, at least 40, at least 50, at least 60, at least 70, at least 80, or at least 90 percent by weight or even 100 percent by weight, in total, of such polymerizable ionic species. According to other embodiments, the polymerizable ionic species in accordance with Formula (I) comprise(s) not more than 99, not more than 95 or not more than 90 percent by weight, in total, of the curable composition. As explained in more detail hereafter, the curable compositions of the present invention may optionally be additionally comprised of one or more curable (polymerizable) compounds which are not polymerizable ionic species in accordance with Formula (I). For example, the curable composition may be comprised of at least 1 percent by weight, at least 5 percent by weight or at least 10 percent by weight, in total, of one or more curable compounds (e.g., ethylenically unsaturated compounds) which are not polymerizable ionic species in accordance with Formula (I). Further, in certain embodiments, the curable composition may be comprised of not more than 50 percent by weight, not more than 40 percent by weight or not more than 30 percent by weight of one or more curable compounds which are not polymerizable ionic species in accordance with Formula (I). The optionally present additional curable compounds may be, for example, polymerizable ionic species not in accordance with Formula (I) and/or non-ionic polymerizable compounds.

The curable compositions of the present invention may be readily prepared simply by blending the above-described precursors to the polymerizable ionic species in the desired proportion(s), in addition to any further optional components of the curable compositions as described elsewhere herein.

Other Polymerizable Components

Curable compositions in accordance with the present invention may optionally comprise one or more polymerizable components other than the polymerizable ionic species previously described, provided that such additional polymerizable components do not interfere with the ability to obtain a cured composition upon curing of the curable composition which is thermoplastic in behavior and fragmentable when contacted with a protic liquid medium. The polymeric matrix which is formed upon curing may be characterized as a polyionic copolymer, which is solid at 25° C. in the absence of a protic liquid medium. Any of the other types of polymerizable ionic species known in the art may be present, for example. Further, any of the precursors used to form the previously described polymerizable ionic species, or salts thereof, may be present as components of the curable composition. For example, where one type of precursor (e.g., one or more polymerizable carboxylic acids, one or more phosphonic acids or one or more sulfonic acids, as a precursor to the polymerizable anionic species) is added in excess of the amount needed to form an ionic species with the other type of precursor (e.g., one or more (meth)acrylamides or one or more N-substituted-(N'-dialkylaminoalkyl) (meth)acrylamides, as a precursor to the polymerizable cationic species), such excess precursor may form part of the curable composition. The curable compositions of the present invention may include one or more polymerizable components other than the polymerizable ionic species which are non-ionic or non-ionizable.

Any of the polymerizable compounds known in the art, in particular free-radically polymerizable compounds containing one or more polymerizable sites of ethylenic unsaturation per molecule, may be utilized. However, in certain embodiments, the curable composition does not contain any such polymerizable compound having more than one polymerizable functional group per molecule in which the multiple polymerizable functional groups are covalently linked. Thus, in such embodiments it is preferred that the curable composition is free of any compound having two or more covalently-linked polymerizable ethylenically unsaturated functional groups per molecule, such as di(meth)acrylates (e.g., (meth)acrylic anhydride). Such compounds may act as covalent crosslinking agents, thereby interfering with the ability to readily fragment, using a protic liquid medium, an article obtained by curing the curable composition. According to certain embodiments, the curable composition is comprised of less than 5, less than 4, less than 3, less than 2, less than 1 or less than 0.5 percent by weight in total of compounds having two or more covalently-linked polymerizable ethylenically unsaturated functional groups per molecule.

Polymerizable, ethylenically unsaturated compounds suitable for use in combination with the above-described polymerizable ionic species include compounds containing at least one carbon-carbon double bond, in particular a carbon-carbon double bond capable of participating in a free radical reaction wherein at least one carbon of the carbon-carbon double bond becomes covalently bonded to an atom, in particular a carbon atom, in a second molecule. Such reactions may result in a polymerization or curing whereby the ethylenically unsaturated compound becomes part of a polymerized matrix or polymeric chain. The carbon-carbon double bond may be present as part of an $\alpha,\beta$-unsaturated carbonyl moiety, e.g., an $\alpha,\beta$-unsaturated ester moiety such as an acrylate functional group or a methacrylate functional group or an $\alpha,\beta$-unsaturated amide moiety such as an acrylamide functional group or a methacrylamide functional group. A carbon-carbon double bond may also be present in the additional ethylenically unsaturated compound in the form of a vinyl group —CH=CH$_2$ (such as an allyl group, —CH$_2$—CH=CH$_2$).

The curable compositions of the present invention may, in particularly preferred embodiments, contain one or more (meth)acrylate and/or (meth)acrylamide functional compounds capable of undergoing free radical polymerization (curing), in addition to one or more polymerizable ionic species as described herein. As used herein, the term "(meth)acrylate" refers to methacrylate (—O—C(=O)—C(CH$_3$)=CH$_2$) as well as acrylate (—O—C(=O)—CH=CH$_2$) functional groups. As used herein, the term "(meth)acrylamide" refers to methacrylamide (—NR—C(=O)—C(CH$_3$)=CH$_2$) as well as acrylamide (—NR—C(=O)—CH=CH$_2$) functional groups, wherein R is H or an organic group such as an alkyl group. Suitable free radical-curable (meth)acrylates and (meth)acrylamides include compounds containing one, two, three, four or more (meth)acrylate or (meth)acrylamide functional groups per molecule, but most preferably only one (meth)acrylate or (meth)acrylamide functional group per molecule; the free radical-curable (meth)acrylates and (meth)acrylamides may be oligomers or monomers. The at least one additional ethylenically unsaturated monomer or oligomer may include, for example, at least one compound selected from the group consisting of cyclic, linear and branched mono-(meth)acrylate-functionalized and mono-(meth)acrylamide-functionalized monomers and oligomers.

The amount in the curable composition of additional polymerizable, ethylenically unsaturated compound relative to the amount of polymerizable ionic species may be selected or controlled as may be appropriate or desired to attain certain properties in the curable composition or the cured resin obtained therefrom. According to certain embodiments of the invention, however, the amount of additional polymerizable, ethylenically unsaturated compound present in the curable composition is not more than 50%, not more than 40%, not more than 30%, not more than 20% or not more than 10% by weight based on the total weight of polymerizable ionic species in accordance with Formula (I).

Suitable free (meth)acrylate oligomers include, for example, polyester (meth)acrylates, epoxy (meth)acrylates, polyether (meth)acrylates, polyurethane (meth)acrylates, acrylic (meth)acrylate oligomers, epoxy-functional (meth)acrylate oligomers and combinations thereof. Preferably, such oligomers contain only one (meth)acrylate functional group per molecule. Such oligomers may be selected and used in combination with the polymerizable, ethylenically unsaturated metal complex(es) and polymerizable, heterocyclic moiety-containing compound(s) in order to enhance the flexibility, strength and/or modulus, among other attributes, of a cured composition prepared using the curable composition of the present invention.

Exemplary polyester (meth)acrylates include the reaction products of acrylic or methacrylic acid or mixtures thereof with hydroxyl group-terminated polyester polyols. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Suitable polyether (meth)acrylates include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, hydroxyl functional materials, polyester polyols and amines.

Polyurethane (meth)acrylates (sometimes also referred to as "urethane (meth)acrylates") capable of being used in the curable compositions of the present invention include urethanes based on aliphatic and/or aromatic polyester polyols and polyether polyols and aliphatic and/or aromatic polyester diisocyanates and polyether diisocyanates capped with one or more (meth)acrylate end-groups (preferably, a single (meth)acrylate end-group).

In various embodiments, the polyurethane (meth)acrylates may be prepared by reacting aliphatic and/or aromatic diisocyanates with OH group-terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. Preferably, the polyurethane (meth)acrylates contain a single (meth)acrylate functional group per molecule.

Suitable acrylic (meth)acrylate oligomers (sometimes also referred to in the art as "acrylic oligomers") include oligomers which may be described as substances having an oligomeric acrylic backbone which is functionalized with one or more (meth)acrylate groups (which may be at a terminus of the oligomer or pendant to the acrylic backbone; preferably, only a single (meth)acrylate group is present). The acrylic backbone may be a homopolymer, random copolymer or block copolymer comprised of repeating units of acrylic monomers. The acrylic monomers may be any monomeric (meth)acrylate such as C1-C6 alkyl (meth)acrylates as well as functionalized (meth)acrylates such as (meth)acrylates bearing hydroxyl, carboxylic acid and/or epoxy groups. Acrylic (meth)acrylate oligomers may be prepared using any procedures known in the art such as oligomerizing monomers, at least a portion of which are functionalized with hydroxyl, carboxylic acid and/or epoxy groups (e.g., hydroxyalkyl(meth)acrylates, (meth)acrylic acid, glycidyl (meth)acrylate) to obtain a functionalized oligomer intermediate, which is then reacted with one or more (meth)acrylate-containing reactants to introduce the desired (meth)acrylate functional groups.

Polymerizable, monofunctional ethylenically unsaturated compounds which are monomers suitable for use in the present invention include the following types of monomers (wherein "monofunctional" means one (meth)acrylate group per molecule):

i) cyclic monofunctional (meth)acrylate monomers, such as isobornyl (meth)acrylate, cyclohexyl (meth)acrylate, 4-tert-butyl cyclohexyl (meth)acrylate and alkoxylated analogues thereof; and ii) linear and branched mono functional (meth)acrylate monomers, such as isodecyl (meth)acrylate, ethoxyethoxyethyl (meth)acrylate, polyethylene mono (meth)acrylates, neopentyl glycol (meth)acrylates and alkoxylated analogues thereof, as well as caprolactone-based (meth)acrylates prepared by addition of one, two, three or more moles of caprolactone to a hydroxyalkyl (meth)acrylate such as hydroxyethyl (meth)acrylate ("caprolactone adducts of hydroxyalkyl (meth)acrylates").

Such monomers may be used to reduce the viscosity of the curable compositions of the present invention and adjust the flexibility, strength, solubility and/or modulus, among other properties, of finished articles obtained by curing the compositions.

Illustrative examples of suitable polymerizable, ethylenically unsaturated monomers containing a single (meth)acrylate functionality include 2-(2-ethoxyethoxy) ethyl (meth)acrylate, 2-phenoxyethyl (meth)acrylate, 3,3,5-trimethylcyclohexyl (meth)acrylate, alkoxylated lauryl (meth)acrylate, alkoxylated phenol (meth)acrylate, alkoxylated tetrahydrofurfuryl (meth)acrylate, caprolactone (meth)acrylate, (meth)acryloxyethyl di(caprolactone), cyclic trimethylolpropane formal (meth)acrylate, cycloaliphatic acrylate monomer, dicyclopentadienyl (meth)acrylate, diethylene glycol methyl ether (meth)acrylate, ethoxylated (4) nonyl phenol (meth)acrylate, ethoxylated nonyl phenol (meth)acrylate, isobornyl (meth)acrylate, isodecyl (meth)acrylate, isooctyl (meth)acrylate, lauryl (meth)acrylate, methoxy polyethylene glycol (meth)acrylate, octyldecyl (meth)acrylate, stearyl (meth)acrylate, tetrahydrofurfuryl (meth) acrylate, tridecyl (meth)acrylate, and/or triethylene glycol ethyl ether (meth)acrylate, t-butyl cyclohexyl (meth)acrylate, alkyl (meth)acrylate, dicyclopentadiene di(meth)acrylate, alkoxylated nonylphenol (meth)acrylate, phenoxyethanol (meth)acrylate, octyl (meth)acrylate, decyl (meth)acrylate, dodecyl (meth)acrylate, tetradecyl (meth)acrylate, tridecyl (meth)acrylate, cetyl (meth)acrylate, hexadecyl (meth)acrylate, behenyl (meth)acrylate, diethylene glycol ethyl ether (meth)acrylate, diethylene glycol butyl ether (meth)acrylate, triethylene glycol methyl ether (meth)acrylate, glycerol carbonate (meth)acrylate and combinations thereof.

According to certain embodiments, the curable composition may be comprised of at least one polymerizable, ethylenically unsaturated compound that contains at least one hydroxyl group per molecule. Examples of such hydroxyl group-containing ethylenically unsaturated compounds include, but are not limited to, caprolactone adducts of hydroxyalkyl (meth)acrylates (compounds corresponding to the general formula $H_2C=C(R)-C(=O)-O-R^1-(OC(=O)-[(CH_2)_5]_n OH$, wherein R=H, $CH_3$, $R^1=C_2-C_4$ alkylene, such as ethylene, propylene, butylene, and n=1-10, e.g., acryloxyethyl di(caprolactone)), hydroxyalkyl (meth)acrylates, alkoxylated (e.g., ethoxylated and/or propoxylated) hydroxyalkyl (meth)acrylates (including mono(meth)acrylates of ethylene glycol and propylene glycol oligomers and polymers), and the like.

Carrier Polymers

Optionally, the curable composition of the present invention may comprise one or more carrier polymers. According to one embodiment, however, no carrier polymer is present in the curable composition. As used herein, the term "carrier polymer" refers to a polymer that does not contain any polymerizable, ethylenically functional groups and consequently does not react or crosslink with the polymerizable ionic species upon curing of the curable composition. However, the carrier polymer may comprise one or more functional groups which interact, in a non-covalent manner, with other components of the curable composition, in particular the polymerizable ionic species. For example, the carrier polymer may be comprised of amine functional groups, amide functional groups, carboxylic acid functional groups, phosphoric acid functional groups, sulfinic acid functional groups, sulfonic acid functional groups, hydroxyl functional groups and/or ester functional groups. According to one embodiment, the curable composition is comprised of a carrier polymer which is water-soluble at 25° C. According to another embodiment, the curable composition is comprised of a carrier polymer that is thermoplastic. In still further embodiments, a carrier polymer is present in the curable composition which is thermoplastic and water-soluble.

Examples of suitable carrier polymers include, but are not limited to, polyvinylpyrrolidones, polyvinylalcohols, polyvinylacetates, polyoxyalkylenes (e.g., polyethylene glycols), (meth)acrylic acid polymers (both homopolymers and copolymers of acrylic acid and/or methacrylic acid with one or more other comonomers), polyethyleneimines, polysaccharides, and the like.

The curable composition may comprise, for example, 0 to 20% by weight carrier polymer, e.g., 1 to 15% by weight carrier polymer, based on the total weight of the curable composition.

Initiators

In certain embodiments of the invention, the curable compositions described herein include at least one photoinitiator and are curable with radiant energy. For example, the photoinitiator(s) may be selected from the group consisting of α-hydroxyketones, phenylglyoxylates, benzyldimethylketals, α-aminoketones, mono-acyl phosphines, bis-acyl phosphines, phosphine oxides, and combinations thereof (such as blends of alpha hydroxyl ketone(s) and acyl phosphine oxide(s), as exemplified by the commercial product Irgacure® 4265). In particular embodiments, the at least one photoinitiator may be 1-hydroxy-cyclohexyl-phenyl-ketone and/or 2-hydroxy-2-methyl-1-phenyl-1-propanone. In other embodiments, the at least one photoinitiator is or includes a phosphine oxide, in particular bis(2,4-6-trimethylbenzoyl) phenyl phosphine oxide, (2,4,6-trimethylbenzoyl)phenylethoxy phosphine oxide, tris(2,4,6-trimethylbenzoyl)phosphine oxide and liquid mixtures thereof.

Suitable photoinitiators include, but are not limited to, 2-methylanthraquinone, 2-ethylanthraquinone, 2-chloroanthraquinone, 2-benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2-diethyloxyacetophenone, diethyloxyacetophenone, 2-isopropylthioxanthone, thioxanthone, diethyl thioxanthone, 1,5-acetonaphthylene, ethyl-p-dimethylaminobenzoate, benzil ketone, α-hydroxy keto, 2,4, 6-trimethylbenzoyldiphenyl phosphine oxide, benzyl dimethyl ketal, benzilketal(2,2-dimethoxy-1,2-diphenylethanone), 1-hydroxycylcohexylphenyl ketone, 2-methyl-1-[4-(methylthio) phenyl]-2-morpholinopropanone-1, 2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone,3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthen-9-one and combinations thereof.

Thus, certain embodiments of the invention involve including in the curable composition at least one photoinitiator or photoinitiator coagent capable of free-radical initiation when irradiated. Illustrative preferred examples of photoinitiators include, but are not limited to, bis(2,4,6-trimethylbenzoyl)phenyl phosphine oxide, bis(2,6-dimethoxybenzoyl)-(2,4,4-trimethylpentyl) phosphine oxide, 2-hydroxy-2-methyl-1-phenylpropan-1-one, ethyl 2,4,6-trimethylbenzylphenyl phosphinate, tertiary amines such as 4-(N,N-dimethylamino)benzoate and N,N-dimethylaminoethyl methacrylate, 1-hydroxy cyclohexyl phenyl ketone, 2,2-dimethoxy-1,2-diphenylethan-1-one, bis(2,4,6-trimethylbenzoyl)phenyl phosphine oxide, 1-[4-(2-hydroxyethoxy)phenyl]-2-methyl-1-propane-1-one, 2-benzyl-2-dimethylamino-1-(4-morpholinophenyl)butanone, 2-methyl-1-[4-(methylthio)phenyl]-2-morpholinopropane-1-one, and 2-hydroxy-2-methyl-1-phenyl propane-1-one.

The amount of photoinitiator may be varied as may be appropriate depending upon the photoinitiator(s) selected, the amounts and types of ethylenically unsaturated compounds present in the curable composition, the radiation source and the radiation conditions used, among other factors. Typically, however, the amount of photoinitiator may be from 0.05% to 5%, preferably 0.1% to 5%, and most preferably 1% to 4.5% by weight, based on the total weight of the curable composition.

In certain embodiments of the invention, the curable compositions described herein do not include any initiator and are curable (at least in part) with electron beam energy. In other embodiments, the curable compositions described herein include at least one free radical initiator that decomposes when heated or in the presence of an accelerator and are curable chemically (i.e., without having to expose the curable composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on M-containing salts (such as, for example, carboxylate salts of transition M-containings such as iron, cobalt, manganese, vanadium and the like and combinations thereof). The accelerator(s) may be selected so as to promote the decomposition of the free radical initiator at room or ambient temperature to generate active free radical species, such that curing of the curable composition is achieved without having to heat or bake the curable composition. In other embodiments, no accelerator is present and the curable composition is heated to a temperature effective to cause decomposition of the free radical initiator and to generate free radical species which initiate curing of the polymerizable compound(s) present in the curable composition.

Thus, in various embodiments of the present invention, the curable compositions described herein are curable by techniques selected from the group consisting of radiation curing (UV radiation or electron beam curing), electron beam curing, chemical curing (using a free radical initiator that decomposes when heated or in the presence of an accelerator, e.g., peroxide curing), heat curing or combinations thereof.

In one embodiment of the invention, a cured composition or article prepared by radiation curing the curable composition is subjected to a further thermal treatment in order to effect more complete curing. For example, a photocured composition or article may be heated at a temperature of 40° C. to 120° C. for a period of time of from 5 minutes to 12 hours.

Antioxidants

To protect against premature gelling or curing of the curable composition, particularly in the presence of oxygen or other oxidant, one or more antioxidants (also referred to as polymerization inhibitors) may be included in the curable composition. Any of the antioxidants known in the art may be utilized, including for example phenol-based antioxidants, phosphorus-based antioxidants, quinone-type antioxidants and combinations thereof.

Examples of suitable phenol-based antioxidants may include hindered phenol-type antioxidants such as hexamethylene bis[(3,5-di-tert-butyl-4-hydroxyphenyl)propionic acid amide], 4,4'-thio bis(6-tert-butyl-m-cresol), 2,2'-methylene bis(4-methyl-5-tert-butylphenol), 2,2'-methylene bis (4-ethyl-6-tert-butylphenol), bis[3,3-bis(4-hydroxy-3-tert-butylphenyl)butyric acid]glycol ester, 2,2'-ethylidene bis(4, 6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(3,5-di-tert-butyl-4-hydroxybenzyl)-2,4,6-trimethylbenzene, 1,3,5-tris[(3,5-di-tert-butyl-4-hydroxyphenyl) propionyloxyethyl]isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4, 8,10-tetraoxaspiro[5.5]undecane, triethylene glycol 25 bis [(3-tert-butyl-4-hydroxy-5-methylphenyl)propionate], and n-octadecyl-3-(4'-hydroxy-3',5'-di-tert-butylphenyl)butane. Butylated hydroxy toluene (BHT) is an example of a preferred antioxidant.

Examples of suitable phosphorus-based antioxidants may include phosphites, phosphonites and the like such as tris-nonylphenyl phosphite, tris(2,4-di-tert-butylphenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, distearyl pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, tetra(tridecyl)isopropylidene diphenol diphosphite, tetra(tridecyl)-4,4'-n-butylidene bis(2-tert-butyl-5-methylphenol)diphosphite, hexa(tridecyl)-1,1,3-tris (2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene bis(4-methyl-6-tert-butylphenyl)-2-ethylhexyl phosphite, and 4-[3-[(2,4,8,10-tetra-tert-butyldibenzo[d,f][1,3,2]dioxaphosphepin)-6-yloxy]propyl]-2-methyl-6-tert-butylphenol.

Quinone-type antioxidants, such as the mono methyl ether of hydroquinone (MEHQ), may also be used. Phenothiazine (RTZ) and vitamin E are examples of other suitable antioxidants useful in the present invention.

Suitable examples of antioxidants/polymerization inhibitors include, but are not limited to hydroquinone, p-methoxyphenol, di-tert-butyl-p-cresol, pyrogallol, p-tert-butylcatechol, benzoquinone, 4,4'-thiobis(3-methyl-6-tert-butylphenol), 2,2'-methylene bis(4-methyl-6-tert-butylphenol), N-nitroso-N-phenylhydroxylaminealuminum salts, phenothiazine, N-nitrosodiphenylamine, N-phenylnaphthylamine, ethylenediamine tetraacetic acid, 1,2-cyclohexanediamine tetraacetic acid, glycol etherdiamine tetraacetic acid, 2,6-di-tert-butyl-p-methylphenol, 5-nitroso-8-hydroxyquinoline, 1-nitroso-2-naphthol, 2-nitroso-1-naphthol, 2-nitroso-5-(N-ethyl-N-sulfopropylamino)phenol, N-nitroso-N-(1-naphthyl)hydroxylamineammonium salts, and bis(4-hydroxy-3,5-tert-butyl)phenylmethane.

Typically, one or more antioxidants (polymerization inhibitors) may be included in the curable composition in a total amount of up to 4% by weight, e.g., 0.05 to 2% by weight, based on the weight of the curable composition.

Light Blockers

The curable compositions of the present invention may additionally comprise one or more light blockers, particularly where the curable composition is to be used as a resin in a three-dimensional printing method involving photocuring of the curable composition. The light blocker(s) may be any such substances known in the three-dimensional printing art, including for example non-reactive pigments and dyes. The light blocker may be a visible light blocker or a UV light blocker, for example. Examples of suitable light blockers include, but are not limited to, titanium dioxide, carbon black and organic ultraviolet light absorbers such as hydroxybenzophenone, hydroxyphenylbenzotriazole, oxanilide, benzophenone, thioxanthone, hydroxyphenyltriazine, Sudan I, bromothymol blue, 2,2'-(2,5-thiophenediyl)bis(5-tert-butylbenzoxazole) (sold under the brand name "Benetex OB Plus") and benzotriazole ultraviolet light absorbers.

The amount of light blocker may be varied as may be desired or appropriate for particular applications. Generally speaking, if the curable composition contains light blocker, it is present in a concentration of from 0.001 to 10% by weight based on the total weight of the curable composition.

Other Components of the Curable Compositions Advantageously, the curable compositions of the present invention may be formulated to be solvent-free, i.e., free of any non-reactive volatile substances (substances having a boiling point at atmospheric pressure of 150° C. or less).

However, in certain other embodiments of the invention, the curable composition may contain one or more solvents, in particular one or more organic solvents, which may be non-reactive organic solvents. In various embodiments, the solvent(s) may be relatively volatile, e.g., solvents having a boiling point at atmospheric pressure of not more than 150° C. In other embodiments, the solvent(s) may have a boiling point at atmospheric pressure of at least 40° C.

The solvent(s) may be selected so as to be capable of solubilizing one or more components of the curable composition and/or adjusting the viscosity or other rheological properties of the curable composition.

However, the curable compositions of the present invention may alternatively be formulated so as to contain little or no non-reactive solvent, e.g., less than 10% or less than 5% or less than 1% or even 0% non-reactive solvent, based on the total weight of the curable composition. Such solventless or low-solvent compositions may be formulated using various components, including for example low viscosity reactive diluents (such as a monomeric polymerizable (meth)acrylate- or (meth)acrylamide-functionalized compound), which are selected so as to render the curable composition sufficiently low in viscosity, even without solvent being present, that the curable composition can be easily applied at a suitable application temperature to a substrate surface so as to form a relatively thin, uniform layer.

Suitable solvents may include, for example, organic solvents such as: ketones; esters; carbonates; alcohols; aromatic solvents such as xylene, benzene, toluene, and ethylbenzene; alkanes; glycol ethers; ethers; amides; as well as combinations thereof.

In preferred embodiments of the invention, the curable composition is a liquid at 25° C. In various embodiments of the invention, the curable compositions described herein are formulated to have a viscosity of less than 5000 cPs, or less than 4000 cPs, or less than 3000 cPs, or less than 2500 cPs, or less than 2000 cPs, or less than 1500 cPs, or less than 1000 cPs or even less than 500 cPs as measured at 25° C. using a Brookfield viscometer, model DV-II, using a 21 mm spindle (with the spindle speed varying typically between 0.5 and 100 rpm, depending on viscosity). In advantageous embodiments of the invention, the viscosity of the curable composition is from 200 to 1000 cPs at 25° C.

The curable compositions of the present invention may optionally contain one or more additives instead of or in addition to the above-mentioned ingredients. Such additives include, but are not limited to, indicators, photostabilizers, foam inhibitors, flow or leveling agents, buffering agents, dyes, colorants, pigments, dispersants (wetting agents, surfactants), slip additives, fillers, chain transfer agents, thixotropic agents, viscosity modifiers, matting agents, impact modifiers, waxes or other various additives, including any of the additives conventionally utilized in the coating, sealant, adhesive, molding, 3D printing or ink arts.

The curable compositions of the present invention are also characterized by containing little or no water and (meth) acrylic anhydride. The curable composition, may, for example, comprise less than less than 10,000 ppm, less than 9000 ppm, less than 8000 ppm, less than 7000 ppm, less than 6000 ppm, less than 5000 ppm, less than 4000 ppm, less than 3000 ppm, less than 2000 ppm, less than 1000 ppm, less than 500 ppm, less than 100 ppm or even (most preferably) 0 ppm (meth)acrylic anhydride. The curable composition, may, for example, comprise less than less than 10,000 ppm, less than 9000 ppm, less than 8000 ppm, less than 7000 ppm, less than 6000 ppm, less than 5000 ppm, less than 4000 ppm, less than 3000 ppm, less than 2000 ppm, less than 1000 ppm, less than 500 ppm, less than 100 ppm or even 0 ppm water.

Uses for the Curable Composition

The curable compositions described herein may be compositions that are to be subjected to curing by means of free radical polymerization or other types of polymerization (e.g., cationic polymerization). In particular embodiments, the curable compositions are photocured (i.e., cured by exposure to actinic radiation, e.g., light, such as visible or UV light). End use applications for the curable compositions include, but are not limited to, inks, coatings (including agricultural coatings and temporary protective coatings), adhesives, 3D printing resins, molding resins, sealants, composites, antistatic layers, electronic applications, recyclable materials, smart materials capable of detecting and responding to stimuli, and biomedical materials.

Cured compositions prepared from curable compositions as described herein may be used, for example, in three-dimensional articles (wherein the three-dimensional article may consist essentially of or consist of the cured composition), coated articles (wherein a substrate is coated with one or more layers of the cured composition, including encapsulated articles in which a substrate is completely encased by the cured composition), laminated or adhered articles (wherein a first component of the article is laminated or adhered to a second component by means of the cured composition), composite articles or printed articles (wherein graphics or the like are imprinted on a substrate, such as a paper, plastic or M-containing substrate, using the cured composition).

Curing of the curable compositions in accordance with the present invention may be carried out by any suitable method, such as free radical and/or cationic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS), and blends thereof, composites, wood, leather and combinations thereof. When used as an adhesive, the curable composition may be placed between two substrates and then cured, the cured composition thereby bonding the substrates together to provide an adhered article.

Curing may be accelerated or facilitated by supplying energy to the curable composition, such as by heating the curable composition and/or by exposing the curable composition to a radiation source, e.g., actinic radiation such as visible or UV light, infrared radiation, and/or electron beam radiation. Thus, the cured composition may be deemed the reaction product of the curable composition, formed by curing.

A plurality of layers of a curable composition in accordance with the present invention may be applied to a substrate surface; the plurality of layers may be simultaneously cured (by exposure to a single dose of radiation, for example) or each layer may be successively cured before application of an additional layer of the curable composition.

The curable compositions which are described herein are especially well-suited for use as resins in three-dimensional printing applications. Three-dimensional (3D) printing (also referred to as additive manufacturing) is a process in which a 3D digital model is manufactured by the accretion of construction material. The 3D printed object is created by utilizing the computer-aided design (CAD) data of an object through sequential construction of two dimensional (2D) layers or slices that correspond to cross-sections of 3D objects. Stereolithography (SL) is one type of additive manufacturing where a liquid resin is hardened by selective exposure to a radiation to form each 2D layer. The radiation can be in the form of electromagnetic waves or an electron beam. The most commonly applied energy source is ultraviolet, visible or infrared radiation.

The inventive curable compositions described herein may be used as 3D printing resin formulations, that is, compositions intended for use in manufacturing three-dimensional articles using 3D printing techniques. Such three-dimensional articles may be free-standing/self-supporting and may consist essentially of or consist of a composition in accordance with the present invention that has been cured. The three-dimensional article may also be a composite, comprising at least one component consisting essentially of or consisting of a cured composition as previously mentioned as well as at least one additional component comprised of one or more materials other than such a cured composition (for example, a metal component, a thermoplastic component or a cured composition obtained by curing a curable composition other than a curable composition in accordance with the present invention). The curable compositions of the present invention are particularly useful in digital light printing (DLP), although other types of three-dimensional (3D) printing methods may also be practiced using the inventive curable compositions (e.g., SLA, inkjet). The 3D printing method may, for example, be a layer-by-layer or continuous printing method.

A method of making a three-dimensional article using a curable composition in accordance with the present invention may comprise the steps of:

a) coating a first layer of a curable composition in accordance with the present invention onto a surface;
b) curing the first layer, at least partially, to provide a cured first layer;
c) coating a second layer of the curable composition onto the cured first layer;
d) curing the second layer, at least partially, to provide a cured second layer adhered to the cured first layer; and
e) repeating steps c) and d) a desired number of times to build up the three-dimensional article.

Although the curing steps may be carried out by any suitable means, which will in some cases be dependent upon the components present in the curable composition, in certain embodiments of the invention the curing is accomplished by exposing the layer to be cured to an effective amount of radiation (e.g., electron beam radiation, UV radiation, visible light, etc.). The three-dimensional article which is formed may be heated in order to effect thermal curing.

Accordingly, in various embodiments, the present invention provides a process comprising the steps of:

a) coating a first layer of a curable composition in accordance with the present invention and in liquid form onto a surface;
b) exposing the first layer imagewise to actinic radiation to form a first exposed imaged cross-section, wherein the radiation is of sufficient intensity and duration to cause at least partial curing (e.g., at least 50% curing, as measured by the % conversion of the polymerizable ethylenically unsaturated functional groups initially present in the curable composition) of the layer in the exposed areas;
c) coating an additional layer of the curable composition onto the previously exposed imaged cross-section;
d) exposing the additional layer imagewise to actinic radiation to form an additional imaged cross-section, wherein the radiation is of sufficient intensity and duration to cause at least partial curing (e.g., at least 50% curing, as measured by the % conversion of the polymerizable ethylenically unsaturated functional groups initially present in the curable composition) of the additional layer in the exposed areas and to cause adhesion of the additional layer to the previously exposed imaged cross-section;
e) repeating steps c) and d) a desired number of times to build up the three-dimensional article.

Thus, the curable compositions of the present invention are useful in the practice of various types of three-dimensional fabrication or printing techniques, including methods in which construction of a three-dimensional object is performed in a step-wise or layer-by-layer manner. In such methods, layer formation may be performed by solidification (curing) of the curable composition under the action of exposure to radiation, such as visible, UV or other actinic irradiation. For example, new layers may be formed at the top surface of the growing object or at the bottom surface of the growing object. The curable compositions of the present invention may also be advantageously employed in methods for the production of three-dimensional objects by additive manufacturing wherein the method is carried out continuously. For example, the object may be produced from a liquid interface. Suitable methods of this type are sometimes referred to in the art as "continuous liquid interface (or interphase) product (or printing)" ("CLIP") methods. Such methods are described, for example, in WO 2014/126830; WO 2014/126834; WO 2014/126837; and Tumbleston et al., "Continuous Liquid Interface Production of 3D Objects," Science Vol. 347, Issue 6228, pp. 1349-1352 (Mar. 20, 2015), the entire disclosure of which is incorporated herein by reference in its entirety for all purposes.

When stereolithography is conducted above an oxygen-permeable build window, the production of an article using a curable composition in accordance with the present invention may be enabled in a CLIP procedure by creating an oxygen-containing "dead zone" which is a thin uncured layer of the curable composition between the window and the surface of the cured article as it is being produced. In such a process, a curable composition is used in which curing (polymerization) is inhibited by the presence of molecular oxygen; such inhibition is typically observed, for example, in curable compositions which are capable of being cured by free radical mechanisms. The dead zone thickness which is desired may be maintained by selecting various control parameters such as photon flux and the optical and curing properties of the curable composition. The CLIP process proceeds by projecting a continuous sequence of actinic radiation (e.g., UV) images (which may be generated by a digital light-processing imaging unit, for example) through an oxygen-permeable, actinic radiation- (e.g., UV-) transparent window below a bath of the curable composition maintained in liquid form. A liquid interface below the advancing (growing) article is maintained by the dead zone created above the window. The curing article is continuously drawn out of the curable composition bath above the dead zone, which may be replenished by feeding into the bath additional quantities of the curable composition to compensate for the amounts of curable composition being cured and incorporated into the growing article.

For example, printing of a three-dimensional article using the curable compositions described herein may be carried out by a process comprising at least the following steps:
a) providing a carrier and an optically transparent member having a build surface, the carrier and build surface defining a build region there between;
b) filling the build region with the curable composition;
c) continuously or intermittently irradiating the build region with actinic radiation to form a cured composition from the curable composition; and
d) continuously or intermittently advancing the carrier away from the build surface to form the three-dimensional article from the cured composition.

The present invention also provides a method of forming a three-dimensional article comprising the steps of: (a) providing a carrier and a build plate, the build plate comprising a semipermeable member, the semipermeable member comprising a build surface and a feed surface separate from the build surface, with the build surface and the carrier defining a build region there between, and with the feed surface in fluid contact with a polymerization inhibitor; then (concurrently and/or sequentially) (b) filling the build region with a curable composition in accordance with the invention, the curable composition contacting the build segment, (c) irradiating the build region through the build plate to produce a solid polymerized region in the build region, with a liquid film release layer comprised of the curable composition formed between the solid polymerized region and the build surface, the polymerization of the liquid film being inhibited by the polymerization inhibitor; and (d) advancing the carrier with the polymerized region adhered thereto away from the build surface on the stationary build plate to create a subsequent build region between the polymerized region and the top zone. In general, the method includes (e) continuing and/or repeating steps (b) through (d) to produce a subsequent polymerized region adhered to a previous polymerized region until the continued or repeated deposition of polymerized regions adhered to one another forms the three-dimensional article.

Once an article has been formed using a curable composition in accordance with the present invention, it may be advantageous to rinse or otherwise contact the surfaces of the article with a suitable solvent for the purpose of removing uncured or partially cured (unhardened) curable composition or components thereof that may be present on such surfaces and that may make such surfaces tacky or otherwise difficult to handle or further process. Such solvent or mixture of solvents should be selected to be one that does not result in swelling or fragmentation of the article and yet effectively cleans the article's surfaces. Generally speaking, suitable solvents for this purpose include non-protic organic solvents having a dielectric constant of not greater than 21. Methyl ethyl ketone and dimethyl carbonate are examples of suitable solvents. Preferably, the solvent or mixture of solvents used contains little or no water (e.g., less than 1000 ppm water). Once the article has been contacted with the solvent(s) for a period of time effective to dissolve at least a portion of the uncured or partially cured substances present at the surfaces of the article into the solvent(s) (wherein such contacting may be conducted with or without agitation), contacting may be discontinued and any residual solvent left on the article surfaces removed by drying or evaporation of the solvent(s).

The curable compositions described herein are also particularly useful in applications in which materials intended for temporary use are needed, such as coatings (including encapsulation coatings) or objects that can be easily removed after a temporary function (e.g., serving as a template in an investment casting process), by simple cleaning with water, other aqueous solution or other protic liquid medium, more particularly by a jet of water. A particular advantage of the curable compositions is that the cured compositions may be readily fragmented without the use of dangerous solvents or corrosive products.

For example, the curable compositions of the present invention may be used in a three-dimensional printing application as a sacrificial support material which serves the temporary function of progressively supporting the shape of an article as it is being built up through three-dimensional printing. Such a support material provided by curing of the curable composition may serve one or more other purposes other than providing support, e.g., filling voids. During a three-dimensional printing process, a first material is deposited to produce the desired article and the curable composition of the present invention is deposited to provide support for specific areas or portions of the article during building and to assure adequate vertical placement of subsequent layers of the first material, wherein the curable composition is cured. At the end of the three-dimensional printing, the sacrificial material (support) formed from the curable composition of the present invention may be removed or otherwise separated from the article using a protic liquid medium (with the 3D-printed article being constructed of a material which resists fragmentation by the protic liquid medium).

Accordingly, one aspect of the present invention provides a method of fabricating an article, wherein the method comprises: creating a three-dimensionally printed piece using three-dimensional printing, the three-dimensionally printed piece comprising a body of the article and a support structure, wherein the support structure is comprised of a curable composition as described herein, in cured form; and separating the body of the component from the support structure by contacting the support structure with a protic liquid medium.

As a protic liquid medium-fragmentable support material, the curable compositions described herein allow for higher pattern resolution greater intricacy and better finishes than other materials known in the art. Contacting the inventive support material with a protic liquid medium such as water can result in rapid, effective removal of the support material, even under relatively mild conditions (e.g., jetting with a stream of water at around room temperature). The 3D-printed article thereby obtained, following removal of the support material, may be essentially or entirely free of residual cured composition, thereby providing a high quality finished 3D-printed article.

Three-dimensional articles obtained by 3D printing using the curable compositions described herein are particularly well-suited for use as disposable (sacrificial) patterns in investment casting operations to produce cast articles, in particular cast metal articles. Investment casting is an industrial process which employs a disposable pattern (specimen or model) that is used to produce a mold in which parts can be cast. Conventionally, the pattern is made by injecting wax or plastic into a pattern die which has been manufactured by machining processes. The pattern produced in the pattern die, which corresponds to the three-dimensional specimen used, is melted or burned out of the mold in which parts are later cast. Since the pattern possesses the shape of the required finished part, the parts which are later cast have the required shape. The mold is built up around the pattern by well-known processes, which typically involves coating the pattern with several coats of a ceramic slurry or other refractory material, with a drying step between each coating step. The pattern which is invested in the ceramic is then placed into a furnace or autoclave, causing the wax or plastic pattern to be melted or burned out of the resulting mold. However, conventional investment casting utilizes pattern die materials that typically require long (8-12 hour) burn-out times at high temperatures.

Removal of the pattern leaves a cavity in the mold, corresponding in shape and dimension to the final part. Molten material, such as molten metal, is then introduced into the mold and solidified by cooling. After solidification, the ceramic mold is broken away to release the finished part.

An article made by printing, in a three-dimensional manner, a curable composition comprising of at least one polymerizable ionic species corresponding to Formula (I):

$$A^+B^- \qquad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group, as described elsewhere herein in more detail, may be substituted for a conventional wax or plastic pattern in such an investment casting process. Such articles, which are comprised of a curable composition resulting from curing of the curable composition, have the advantage of being readily fragmented when contacted with a protic liquid medium such as water, alcohol or aqueous alcohol. Thus, the long burn-out times typically associated with the use of conventional investment patterns may be avoided using the present invention.

In certain embodiments, a curable composition in accordance with the present invention is used in applications in which it is desired to provide a material having a temporary function or temporary use such as coatings or objects that can be easily removed after a temporary function, by simple cleaning with water or salt water or another aqueous solution, more particularly by a water jet and optionally at a suitable temperature greater than the glass transition temperature of the cured product obtained from the curable composition. A particular desired advantage of these functional coatings, articles or parts is that they are friendly to operator health and to the environment in general without the use of dangerous solvents or of corrosive products which can have an effect on health and the environment. Further applications of practical interest take advantage of the high water sensitivity of the cured composition and its capacity to form gels in water (hydrogels) that can be used as vectors for various active ingredients in an aqueous medium and that can be easily removed if necessary.

More particularly, the present invention relates to products which are produced by curing curable compositions in accordance with the present invention and which are water-fragmentable or (e.g., water-soluble), thus enabling them to be completely removed with water or in a protic liquid medium as set out above. In particular, this type of product may act as a support material (also termed sacrificial material) for parts undergoing construction using a 3D printing technique, in particular according to a 3D inkjet/polyjet technique involving projection of a curable composition (also termed resin) and curing by means of radiation, in particular UV radiation, layer by layer or continuously. Said support or sacrificial material is subsequently removed by means of simply passing through a bath of water or other protic liquid medium with the composition and the temperature of the bath being adjusted to the technique and to the curable composition used. In certain cases, it may be necessary to have stirring or a dipping time and/or the presence of additives allowing or promoting this removal.

At the end of the three-dimensional printing, the sacrificial (support) material must dissolve or be removed by water-fragmentation rapidly in water or an aqueous solution without leaving marks on the surface of the 3D object thus produced. The temporary-use material to be sacrificed is water-fragmentable according to the present invention if, after having been placed in water or other aqueous or protic liquid medium with stirring or other agitation, the material disintegrates in the form of a "water-dispersible" or "water-soluble" fraction (passing into the aqueous phase after filtration through standard filter paper) and/or a residual solid fraction (after filtration) of homogeneous particle size not exceeding 10 mm.

Illustrative, non-limiting aspects of the present invention may be summarized as follows:

Aspect 1: A method of making a three-dimensional article, comprising printing the three-dimensional article using a curable composition comprised of at least one polymerizable ionic species corresponding to Formula (I):

$$A^+B^- \qquad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group;

wherein the curable composition comprises less than 10,000 ppm of each of (meth)acrylic anhydride and water and wherein the curable composition when cured provides a cured composition which is thermoplastic in the absence of a protic liquid medium, is fragmentable in a protic liquid medium and comprises ionic crosslinks as a result of incorporation of the ionic species into a polymeric matrix.

Aspect 2: The method of Aspect 1, wherein the curable composition when cured provides a cured composition having a hardness greater than 20 on a Durometer 00 scale or greater than 0 on an A and D scale.

Aspect 3: The method of Aspect 1 or 2, wherein the curable composition when cured provides a cured composition which has a glass transition temperature of at least 35° C.

Aspect 4: The method of any of Aspects 1 to 3, wherein the anionic species is a (meth)acrylamide comprising an anionic functional group.

Aspect 5: The method of any of Aspects 1 to 4, wherein the cationic species is a protonated (meth)acrylamide.

Aspect 6: The method of any of Aspects 1 to 5, wherein the anionic functional group is selected from the group consisting of a sulfonate functional group, a sulfinate functional group, a phosphonate functional group, and a carboxylate functional group.

Aspect 7: The method of any of Aspects 1 to 6, wherein the cationic functional group is selected from the group consisting of ammonium functional groups and N-protonated amide functional groups.

Aspect 8: The method of any of Aspects 1 to 3 or 5 to 7, wherein the anionic species is selected from the group consisting of 2-acrylamido-2-methylpropane sulfonate, 2-methylacrylamido-2-methylpropanesulfonate, 2-acrylamidobutanesulfonate, 2-acrylamido-2,4,4-trimethylpentanesulfonic acid, vinylsulfonate, allylsulfonate, acrylate, methacrylate, crotonate, itaconate, maleate, fumarate, itaconate, vinylphosphonate, allylphosphonate, N-(meth)acrylamidoalkylphosphonate, and (meth)acryloyloxyalkylphosphonate.

Aspect 9: The method of any of Aspects 1 to 4 or 6 to 8, wherein the cationic species is selected from the group consisting of protonated (meth)acrylamide, protonated N,N-dimethyl(meth)acrylamide, protonated N-substituted-(N'-dialkylaminoalkyl) (meth)acrylamides, protonated aminoalkyl (meth)acrylates, protonated dialkylaminoalkyl(meth)acrylates, protonated diacetone (meth)acrylamides and protonated tert-butylaminoethyl (meth)acrylates.

Aspect 10: The method of any of Aspects 1 to 9, wherein the anionic species is 2-acrylamido-2-methylpropane sulfonate and the cationic species is protonated N,N-dimethyl acrylamide.

Aspect 11: The method of any of Aspects 1 to 10, wherein the curable composition additionally comprises at least one carrier polymer which is a water-soluble thermoplastic.

Aspect 12: The method of any of Aspects 1 to 11, wherein the curable composition additionally comprises at least one additive selected from the group consisting of photoinitiators, antioxidants, and light blockers.

Aspect 13: The method of any of Aspects 1 to 12, wherein the curable composition does not contain more than 5000 ppm in total of any compound containing two or more polymerizable ethylenically unsaturated functional groups and capable of forming covalent crosslinks in the cured composition.

Aspect 14: The method of any of Aspects 1 to 13, wherein the curable composition additionally comprises at least one polymerizable mono-ethylenically unsaturated co-monomer which is not a polymerizable ionic species corresponding to Formula (I).

Aspect 15: The method of any of Aspects 1 to 14, comprising curing the curable composition by initiating free radical polymerization of the curable composition.

Aspect 16: The method of any of Aspects 1 to 15, comprising photocuring the curable composition.

Aspect 17: The method of any of Aspects 1 to 16, wherein printing of the three-dimensional article is carried out in a layer-by-layer or continuous manner.

Aspect 18: The method of any of Aspects 1 to 17, wherein printing of the three-dimensional article comprises at least the following steps:
a) coating a first layer of the curable composition onto a surface;
b) curing the first layer, at least partially, to provide a cured first layer;
c) coating a second layer of the curable composition onto the cured first layer;
d) curing the second layer, at least partially, to provide a cured second layer adhered to the cured first layer; and
e) repeating steps c) and d) a desired number of times to build up the three-dimensional article.

Aspect 19: The method of any of Aspects 1 to 18, wherein printing of the three-dimensional article comprises at least the following steps:
a) coating a first layer of the curable composition in liquid form onto a surface;
b) exposing the first layer imagewise to actinic radiation to form a first exposed imaged cross-section, wherein the radiation is of sufficient intensity and duration to cause at least partial curing of the first layer in the exposed area(s);
c) coating an additional layer of the curable composition in liquid form onto the previously exposed imaged cross-section;
d) exposing the additional layer imagewise to actinic radiation to form an additional imaged cross-section, wherein the radiation is of sufficient intensity and duration to cause at least partial curing of the additional layer in the exposed area(s) and to cause adhesion of the additional layer to the previously exposed imaged cross-section;
e) repeating steps c) and d) a desired number of times to build up the three-dimensional article.

Aspect 20: The method of any of Aspects 1 to 17, wherein printing of the three-dimensional article comprises at least the following steps:
a) providing a carrier and an optically transparent member having a build surface, the carrier and build surface defining a build region there between;
b) filling the build region with the curable composition;
c) continuously or intermittently irradiating the build region with actinic radiation to form a cured composition from the curable composition; and
d) continuously or intermittently advancing the carrier away from the build surface to form the three-dimensional article from the cured composition.

Aspect 21: A three-dimensional article obtained by the method of any of Aspects 1 to 20.

Aspect 22: A method of forming a pattern for casting, comprising investing a three-dimensional article with a refractory material, fragmenting the three-dimensional article invested in the refractory material with a protic liquid medium, and removing the fragmented three-dimensional article from the refractory material to provide a cavity in the refractory material, wherein the three-dimensional article is obtained by three-dimensional printing and curing a curable composition comprised of at least one polymerizable ionic species corresponding to Formula (I):

$$A^+B^- \qquad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group;

wherein the curable composition when cured provides a cured composition which is thermoplastic in the absence of a protic liquid medium, fragmentable in a protic liquid medium and comprises ionic crosslinks as a result of incorporation of the ionic species into a polymeric matrix.

Aspect 23: A method of making a three-dimensional article, comprising:
a) printing a precursor article to the three-dimensional article using a first material and, as a support material to the first material, a curable composition comprised of at least one polymerizable ionic species corresponding to Formula (I):

$$A^+B^- \qquad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group;

wherein the curable composition when cured provides a cured composition which is thermoplastic in the absence of a protic liquid medium, fragmentable in a protic liquid medium and comprises ionic crosslinks as a result of incorporation of the ionic species into a polymeric matrix, to obtain a precursor article comprised of at least one region comprised of the first material and at least one region comprised of the curable composition in cured form; and b) contacting the precursor article with a protic liquid medium under conditions effective to fragment the at least one region comprised of the curable composition in cured form.

Aspect 24: A curable composition for use in making a pattern for casting, wherein the curable composition is comprised of at least one polymerizable ionic species corresponding to Formula (I):

$A^+B^-$                    (I)

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group;

wherein the curable composition comprises less than 10,000 ppm of each of (meth)acrylic anhydride and water and wherein the curable composition when cured provides a cured composition which is thermoplastic in the absence of a protic liquid medium, fragmentable in a protic liquid medium and comprises ionic crosslinks as a result of incorporation of the ionic species into a polymeric matrix.

Aspect 25: A method of making a curable composition in accordance with Aspect 24, comprising combining at least one precursor for the cationic species and at least one precursor for the anionic species, wherein upon combining such precursors undergo interaction with each other to yield the polymerizable ionic species.

Aspect 26: The method of Aspect 25, wherein the at least one precursor for the cationic species includes an ethylenically unsaturated nitrogen-containing compound and the at least one precursor for the anionic species includes an ethylenically unsaturated acid functional monomer.

Aspect 27: Use of a curable composition in making a pattern for casting, wherein the curable composition is comprised of at least one polymerizable ionic species corresponding to Formula (I):

$A^+B^-$                    (I)

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group;

wherein the curable composition comprises less than 10,000 ppm of each of (meth)acrylic anhydride and water and wherein the curable composition when cured provides a cured composition which is thermoplastic in the absence of a protic liquid medium, fragmentable in a protic liquid medium and comprises ionic crosslinks as a result of incorporation of the ionic species into a polymeric matrix.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition, process using the curable composition, or article made using the curable composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

The following components are combined in a 120 mL amber jar: 2-acrylamido-2-methylpropane sulfonic acid (30 g), N,N-dimethylacrylamide (40 g), N-[3-(dimethylamino)propyl]methacrylamide (20 g), polyvinylpyrrolidone (10 g; number average molecular weight 50,000 daltons), and Irgacure® 4265 antioxidant (2 g). The jar is capped and placed on a mixing roller at 60° C. for 1 hour or until all solids are dissolved. The resulting curable composition in accordance with the present invention is allowed to cool to room temperature; the curable composition, which is comprised of at least one polymerizable ionic species, may be used in a three-dimensional printing process to provide a printed article.

Example 2

Example 1 is repeated using the following components: 2-acrylamido-2-methylpropane sulfonic acid (30 g), N,N-dimethylacrylamide (40 g), N-[3-(dimethylamino)propyl]methacrylamide (20 g), and Irgacure® 4265 antioxidant (2 g).

Example 3

Example 1 is repeated using the following components: 2-acrylamido-2-methylpropane sulfonic acid (30 g), N,N-dimethylacrylamide (40 g), N-[3-(dimethylamino)propyl]methacrylamide (20 g), N-t-butyl acrylamide (10 g), and Irgacure® 4265 antioxidant (2 g).

Example 4

Example 1 is repeated using the following components: 2-acrylamido-2-methylpropane sulfonic acid (30 g), N,N-dimethylacrylamide (40 g), N-[3-(dimethylamino)propyl]methacrylamide (20 g), diacetone acrylamide (10 g), and Irgacure® 4265 antioxidant (2 g).

Example 5

Example 1 is repeated using the following components: 2-acrylamido-2-methylpropane sulfonic acid (30 g), N-[3-(dimethylamino)propyl]methacrylamide (70 g), and Irgacure® 4265 antioxidant (2 g).

The invention claimed is:

1. A method of making a three-dimensional article, comprising printing the three-dimensional article using a curable composition comprised of at least one polymerizable ionic species corresponding to Formula (I):

$$A^+ B^- \quad (I)$$

wherein $A^+$ is a cationic species comprising a cationic functional group and a first polymerizable, ethylenically unsaturated functional group; and $B^-$ is an anionic species comprising an anionic functional group and a second polymerizable, ethylenically unsaturated functional group which is the same as or different from the first polymerizable, ethylenically unsaturated functional group; wherein the curable composition comprises less than 10,000 ppm of each of (meth)acrylic anhydride and water and wherein the curable composition when cured provides a cured composition which is thermoplastic in the absence of a protic liquid medium, is fragmentable in a protic liquid medium and comprises ionic crosslinks as a result of incorporation of the ionic species into a polymeric matrix.

2. The method of claim 1, wherein the curable composition when cured provides a cured composition having a hardness greater than 20 on a Durometer OO scale or greater than 0 on an A and D scale.

3. The method of claim 1, wherein the curable composition when cured provides a cured composition which has a glass transition temperature of at least 35° C.

4. The method of claim 1, wherein the anionic species is a (meth)acrylamide comprising an anionic functional group.

5. The method of claim 1, wherein the cationic species is a protonated (meth)acrylamide.

6. The method of claim 1, wherein the anionic functional group is selected from the group consisting of a sulfonate functional group, a sulfinate functional group, a phosphonate functional group, and a carboxylate functional group.

7. The method of claim 1, wherein the cationic functional group is selected from the group consisting of ammonium functional groups and N-protonated amide functional groups.

8. The method of claim 1, wherein the anionic species is selected from the group consisting of 2-acrylamido-2-methylpropane sulfonate, 2-methylacrylamido-2-methylpropanesulfonate, 2-acrylamidobutanesulfonate, 2-acrylamido-2,4,4-trimethylpentanesulfonic acid, vinylsulfonate, allylsulfonate, acrylate, methacrylate, crotonate, itaconate, maleate, fumarate, vinylphosphonate, allylphosphonate, N-(meth)acrylamidoalkylphosphonate, and (meth)acryloyloxyalkylphosphonate.

9. The method of claim 1, wherein the cationic species is selected from the group consisting of protonated (meth)acrylamide, protonated N,N-dimethyl(meth)acrylamide, protonated N-substituted-(N'-dialkylaminoalkyl) (meth)acrylamides, protonated aminoalkyl(meth)acrylates, protonated dialkylaminoalkyl(meth)acrylates, protonated diacetone (meth)acrylamides and protonated tert-butylaminoethyl (meth)acrylates.

10. The method of claim 1, wherein the anionic species is 2-acrylamido-2-methylpropane sulfonate and the cationic species is protonated N, N-dimethyl acrylamide.

11. The method of claim 1, wherein the curable composition additionally comprises at least one carrier polymer which is a water-soluble thermoplastic.

12. The method of claim 1, wherein the curable composition additionally comprises at least one additive selected from the group consisting of photoinitiators, antioxidants, and light blockers.

13. The method of claim 1, wherein the curable composition does not contain more than 5000 ppm in total of any compound containing two or more polymerizable ethylenically unsaturated functional groups and capable of forming covalent crosslinks in the cured composition.

14. The method of claim 1, wherein the curable composition additionally comprises at least one polymerizable mono-ethylenically unsaturated co-monomer which is not a polymerizable ionic species corresponding to Formula (I).

15. The method of claim 1, comprising curing the curable composition by initiating free radical polymerization of the curable composition.

16. The method of claim 1, comprising photocuring the curable composition.

17. The method of claim 1, wherein printing of the three-dimensional article is carried out in a layer-by-layer or continuous manner.

18. The method of claim 1, wherein printing of the three-dimensional article comprises at least the following steps:
a) coating a first layer of the curable composition onto a surface;
b) curing the first layer, at least partially, to provide a cured first layer;
c) coating a second layer of the curable composition onto the cured first layer;
d) curing the second layer, at least partially, to provide a cured second layer adhered to the cured first layer; and
e) repeating steps c) and d) a desired number of times to build up the three-dimensional article.

19. The method of claim 1, wherein printing of the three-dimensional article comprises at least the following steps:
a) coating a first layer of the curable composition in liquid form onto a surface;
b) exposing the first layer imagewise to actinic radiation to form a first exposed imaged cross-section, wherein the radiation is of sufficient intensity and duration to cause at least partial curing of the first layer in the exposed area(s);
c) coating an additional layer of the curable composition in liquid form onto the previously exposed imaged cross-section;
d) exposing the additional layer imagewise to actinic radiation to form an additional imaged cross-section, wherein the radiation is of sufficient intensity and duration to cause at least partial curing of the additional layer in the exposed area(s) and to cause adhesion of the additional layer to the previously exposed imaged cross-section;
e) repeating steps c) and d) a desired number of times to build up the three-dimensional article.

20. The method of claim 1, wherein printing of the three-dimensional article comprises at least the following steps:
a) providing a carrier and an optically transparent member having a build surface, the carrier and build surface defining a build region there between;
b) filling the build region with the curable composition;
c) continuously or intermittently irradiating the build region with actinic radiation to form a cured composition from the curable composition; and d) continuously or intermittently advancing the carrier away from the build surface to form the three-dimensional article from the cured composition.

21. A three-dimensional article obtained by the method of claim 1.

* * * * *